Patented June 17, 1930

1,764,511

UNITED STATES PATENT OFFICE

TURE ROBERT HAGLUND, OF STOCKHOLM, SWEDEN

PROCESS FOR PRODUCING METALS AND ALLOYS

No Drawing. Application filed January 28, 1928, Serial No. 250,328, and in Sweden February 1, 1927.

This invention relates to improvements in such processes for producing metals and alloys in electric furnaces, wherein the reducing agent at least for a substantial part consists of carbon reducing agents, such as coke, anthracite, charcoal and similar substances, and in which the metal or alloy reduced out is covered in the furnace by a layer of slag preferably formed during the reduction process. It further relates to such processes, wherein the heat necessary for carrying through the reduction is admitted by means of one or more electrodes working in the charge, in or above the slag bath.
The invention is substantially characterized thereby that the current density per cm.² of the cross-section of the electrode is regulated during the reduction with the carbon materials to be as an average below 2.5 ampères and preferably amounts only to 1–2 ampères, and further that in connection therewith the electric conductivity of the charge is considerably lowered below the conductivity of a corresponding charge that in the common way is composed of oxide or oxide ore together with reducing carbon in lumps or grain form. Such a lowering of the conductivity of the charge may be reached in a simple way by intimately mixing the carbonaceous reducing agent in a finely divided state with oxidiferous material, such as oxide, oxide ore or slag forming admixtures, whereupon the mixture is formed into briquettes, for instance by use of usual binding agents, such as pitch or others.

Such briquetting of the components of the charge is in itself already known and is the object of this invention only in connection with the use of an exceptionally low current density.

In older processes wherein the carbon reducing agent, such as coke, was admitted in lumps or grain form, a considerable layer of carbon was formed below the electrodes, through which layer metal reduced out drops down hereby taking up carbon. In such processes, therefore, it was possible only in certain exceptional cases to produce alloys with a low carbon content; and in such processes it was believed to be a general rule that the bottom heat in the furnace would be highest if a high current density was used, such as 6–8 ampères per cm.² of the electrode area. In processes using briquetted material the said rule has also been hitherto accepted for good, and a high current density was used in order to obtain the high temperature in the lower part of the furnace necessary for the production of carbon-poor metals. By experiments I have, however, proved that especially by the reduction of oxides more difficult to reduce than the oxides of iron, quite contrary to what could be expected a considerable decrease of the current density caused that a higher temperature could be maintained in the lower part of the furnace than when working with a high current density. Thus, in most cases the best results were obtained when using a current density of 1–2 ampères per cm.² of the electrode cross-section, that is the cross-section counted as usually on the unused electrode. Lower current density than 1 ampère causes as a rule a decrease of the temperature because at that point the losses of heat by conduction begin to dominate. In certain cases, however, even down to 0.5 ampère per cm.² electrode area may be used with advantage. It is convenient to work with a comparatively high voltage, because thereby the arc formation will become more powerful and the possibility for the reduced metal to absorb carbon from the electrodes will be diminished. When using single-phase furnaces with two top electrodes the voltage between the electrodes during the reduction should preferably not be less than 150 volts, and can with advantage be kept considerably higher.
The reason why a better result is reached when working with briquetted material at a lower current density seems to be that the slag bath at a high current density easily gets into a violent turbulent or boiling state and swells, causing the electrodes to rise thereby making it more difficult to keep the bottom hot. When using a lower current density in accordance with this invention, however, the reduction occurs more quietly and the electrodes keep themselves deeper down in the furnace thereby maintaining its bottom hot.

It is not necessary when applying this invention to have all the charging materials in a briquetted state. The electric conductivity of the charge does indeed decrease considerably already when briquetting a part of the carbon reducing agent. Therefore, in many cases it will be enough to have 30–60% of the carbon reducing agent added in the form of briquettes containing also oxidiferous material, the remainder being added in lump or grain form as coke, anthracite, charcoal or the like. When briquetting for instance 50% of the carbon material, the percentage of carbon in lump form will namely decrease from about 60 to 70% of the volume to only 25 to 30% of the volume of the charge. The spreading of the electric current through the charge will of course decrease still more. It is according to this invention not necessary to add more oxide material in the briquettes than necessary for obtaining the desired diminishing of the conductivity but in some cases, for example if the oxide or oxide ore wholly or partly are used as ingredients in the briquettes, one may admit a surplus of oxide in relation to the amount of reducing agents in the briquettes.

For the smelting, electric reduction furnaces of similar types as those used in the production of ferro-silicon and carbide may be used. The furnace bottom should be made out of fire-proof non-carbonaceous material, for example magnesite, that preferably is sintered or melted into the furnace. The charge is preferably smelted discontinually the whole charge being added at one time soon after the tapping, or successively. After the charge is molten, the same is subjected to a strong superheating to refine the metal or alloy. During this refining or superheating period another current density or voltage than during the reduction process may be used, for instance a lower voltage and a higher current density. To facilitate the refining for instance when producing alloys of iron with one or more of the metals chromium, manganese, tungsten, vanadium, it will be suitable to regulate the amount of carbon reducing agents so that a slag containing a high percentage of oxides of one or more of the said metals is formed. The higher percentage of such oxides the slag contains, the easier it will be to obtain a low percentage of carbon in the alloy. When producing very carbon-poor products, it will therefore, provided that too much slag is not formed, be suitable if the percentage of such oxides in the slag exceeds 35%, and very good results are reached with 40–60%. When working with a high percentage of such oxides in the slag, it is most preferable to reduce a further quantity of oxide out of the slag before tapping by means of some metallic reagent.

In the terms metal, alloy and metallic reagent is also according to this invention included silicon and silicon alloys.

In the description and in the claims the terms "bricks", "briquettes" and "lumps" are understood to comprise pieces ranging in size from that of a grain up to larger size, and the term "difficultly reducible oxide" means oxides more difficult to reduce than the oxides of iron.

I claim:—

1. Process for reducing oxide or oxide ores by means of carbon reducing agents in an electric furnace working with one or more electrodes against a slag bath covering the reduced metal or alloy comprising adding round the electrodes ore of difficultly reducible oxide together with carbon reducing agents previously prepared for diminishing the tendency, owing to the conductivity of the carbon material, of spreading the energy sideways in the unfused charge and regulating during the reduction with the carbon material the current density to be as an average below 2.5 ampères per cm.$^2$ of the cross-section of the electrodes.

2. Process for reducing oxide or oxide ores by means of carbon reducing agents in an electric furnace working with one or more electrodes against a slag bath covering the reduced metal or alloy comprising admitting at least a part of the carbon reducing agents contained in the charge as constituent in briquettes, which at the same time contain a considerable amount of oxide material, and regulating during the reduction with the carbon material the current density to be as an average between 0.5–2 ampères per cm.$^2$ of the cross-section of the electrodes.

3. Process for reducing oxide or oxide ores in an electric furnace working with one or more electrodes against a slag bath covering the reduced metal or alloy, comprising adding at least a considerable part of the reducing agents contained in the charge in form of briquettes, made out of a mixture containing carbon and oxide material, and another part in form of lumps of carbon material, and regulating the current density to be as an average below 2.5 ampères per cm.$^2$ of the cross-section of the electrodes.

4. Process for reducing oxide or oxide ores by means of carbon reducing agents in an electric furnace working with one or more electrodes against a slag bath covering the reduced metal or alloy, comprising adding a charge containing at least a considerable part of the oxide raw material briquetted together with between 30–60 percent of the carbon reducing agent and the other part of the carbon reducing agent as lumps of carbon material and regulating the current density during the reduction with the carbon material to be as an average between 0.5–2 ampères per $cm.^2$ of the cross-section of the electrodes.

5. Process for reducing oxide or oxide ores in an electric furnace working with one or more electrodes against a slag bath covering the reduced metal or alloy, comprising adding at least a considerable part of the reducing agents contained in the charge as ingredients of briquettes, made out of a mixture containing carbon material and mainly slag forming oxide material, and regulating during the reduction with the carbon material the current density to be as an average below 2.5 ampères per $cm.^2$ of the cross-section of the electrodes.

6. Process for producing chromium or chromium alloys out of chromium oxide containing raw material in an electric furnace working with one or more electrodes against a slag bath covering the reduced metal or alloy, comprising adding at least a considerable part of the reducing agent contained in the charge as ingredients of briquettes, made out of a mixture containing carbon and oxide material, regulating the amount of carbon reducing agent as to form a slag containing at least 35 percent of chromium oxide and regulating the current density on reducing with said carbon material to be as an average below 2.5 ampères per $cm.^2$ of the cross-section of the electrodes and after the charge is fused reducing a further part of the chromium oxide by adding a metallic reagent.

In testimony whereof I have hereunto set my hand.

TURE ROBERT HAGLUND.